US008991278B2

(12) United States Patent
Cooper

(10) Patent No.: US 8,991,278 B2
(45) Date of Patent: Mar. 31, 2015

(54) OVERFORCE PROTECTION MECHANISM

(75) Inventor: Thomas G. Cooper, Menlo Park, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 1181 days.

(21) Appl. No.: 12/780,773

(22) Filed: May 14, 2010

(65) Prior Publication Data

US 2011/0277576 A1 Nov. 17, 2011

(51) Int. Cl.
*B25J 19/00* (2006.01)
*G05G 9/00* (2006.01)

(52) U.S. Cl.
CPC . *G05G 9/00* (2013.01); *Y10S 901/49* (2013.01)
USPC .................. 74/470; 74/519; 606/130; 901/49

(58) Field of Classification Search
CPC ................................ G05G 9/00; B25J 19/0016
USPC .................. 74/519–522.5, 470, 469, 490.01; 267/166–179; 901/49; 606/130
See application file for complete search history.

(56) References Cited

U.S. PATENT DOCUMENTS

| | | | | |
|---|---|---|---|---|
| 4,756,204 | A * | 7/1988 | Wittwer et al. | 74/469 |
| 5,695,500 | A * | 12/1997 | Taylor et al. | 606/130 |
| 7,164,968 | B2 * | 1/2007 | Treat et al. | 700/245 |
| 7,428,855 | B2 * | 9/2008 | Duval | 74/516 |
| 7,541,528 | B2 * | 6/2009 | Lyles | 84/312 R |
| 7,544,155 | B2 * | 6/2009 | Agrawal et al. | 482/69 |
| 7,592,528 | B2 * | 9/2009 | Lyles et al. | 84/297 R |
| 7,692,079 | B2 * | 4/2010 | Lyles | 84/312 R |
| 7,798,035 | B2 * | 9/2010 | Duval | 74/490.01 |
| 7,855,330 | B2 * | 12/2010 | Lyles et al. | 84/297 R |
| 7,888,570 | B2 * | 2/2011 | Lyles et al. | 84/297 R |
| 8,220,765 | B2 * | 7/2012 | Bailey | 248/325 |
| 8,441,615 | B2 * | 5/2013 | Hashemi et al. | 355/72 |
| 2003/0114731 | A1 * | 6/2003 | Cadeddu et al. | 600/114 |
| 2006/0241539 | A1 * | 10/2006 | Agrawal et al. | 602/23 |
| 2007/0156122 | A1 | 7/2007 | Cooper | |
| 2010/0243344 | A1 * | 9/2010 | Wyrobek et al. | 180/21 |
| 2011/0187036 | A1 * | 8/2011 | Duval | 267/177 |
| 2012/0310256 | A1 * | 12/2012 | Brisson | 606/130 |

OTHER PUBLICATIONS

Vertut, Jean and Phillipe Coiffet, Robot Technology: Teleoperation and Robotics Evolution and Development, English translation Prentice-Hall, Inc., Inglewood Cliffs, NJ, USA 1986, vol. 3A, 332 pages.

* cited by examiner

*Primary Examiner* — Justin Krause
*Assistant Examiner* — Gregory Prather

(57) ABSTRACT

A overload protection mechanism protects a driven load, such as a driven lever. An overload lever is pivotally coupled to a first part of the driven load. The overload lever has a first end that receives an applied force and an opposing second end. A zero length spring mechanism is coupled to a second part of the driven load spaced apart from the first part and to the second end of the overload lever. The zero length spring mechanism urges the second end of the overload lever toward the second part of the driven load with a force that is substantially proportional to the distance between the second end of the overload lever and the second part of the driven load. A stop mechanism is coupled to the zero length spring mechanism to maintain a minimum distance between the second end of the overload lever and the second part of the driven load.

17 Claims, 3 Drawing Sheets

OVERFORCE PROTECTION MECHANISM

BACKGROUND

1. Field

Embodiments of the invention relate to the field of yieldable connecting rods; and more specifically, to automatic release mechanisms for connecting rods.

2. Background

Minimally invasive surgery (MIS) (e.g., endoscopy, laparoscopy, thoracoscopy, cystoscopy, and the like) allows a patient to be operated upon through small incisions by using elongated surgical instruments introduced to an internal surgical site. Generally, a cannula is inserted through the incision to provide an access port for the surgical instruments. The surgical site often comprises a body cavity, such as the patient's abdomen. The body cavity may optionally be distended using a clear fluid such as an insufflation gas. In traditional minimally invasive surgery, the surgeon manipulates the tissues by using hand-actuated end effectors of the elongated surgical instruments while viewing the surgical site on a video monitor.

The elongated surgical instruments will generally have an end effector in the form of a surgical tool such as a forceps, a scissors, a clamp, a needle grasper, or the like at one end of an elongate tube. The surgical tool is generally coupled to the elongate tube by one or more articulated sections to control the position and/or orientation of the surgical tool. An actuator that provides the actuating forces to control the articulated section is coupled to the other end of the elongate tube. A means of coupling the actuator forces to the articulated section runs through the elongate tube. Two actuators may be provided to control two articulated sections, such as an "arm" that positions the surgical tool and a "wrist" the orients and manipulates the surgical tool, with means for coupling both actuator forces running through the elongate tube.

It may desirable that the elongate tube be somewhat flexible to allow the surgical instrument to adapt to the geometry of the surgical access path. In some cases, the articulated sections provide access to a surgical site that is not directly in line with the surgical access port. It may be desirable to use cables as the means of coupling the actuator forces to the articulated sections because of the flexibility they provide and because of the ability of a cable to transmit a significant force, a substantial distance, through a small cross-section. However, a cable is only able to safely transmit a limited force. Thus it is generally necessary to provide a means for limiting the amount of force applied to the cable.

In a surgical application, the cable may be driven through an input range of motion at an input end by an actuator. The input range of motion is intended to drive an end effector, such as a surgical tool or articulated joint, through a corresponding output range of motion. However, the end effector may be prevented from moving, such as by contacting a solid obstruction. Thus the end effector may hold the output end of the cable in a fixed position, which may be at the end of its range of motion, while the actuator attempts to move the input end of the cable through its full range of motion. This will result in breakage of the cable without a protective mechanism.

Backdrivability, the ability of the mechanical system to move the input axis from the output axis, is one possible protective mechanism. However, a cable driven output lacks backdrivability because forces cannot be reliably transmitted by pushing on a cable. Without backdrivability, elastic components in series to the actuator output may be added as a protective mechanism. It is difficult to have enough elasticity and enough output force simultaneously.

A cable of small diameter, such as would be used to transmit motive forces to the end effectors of a laparoscopic surgical instrument, needs to be able to transmit forces that are close to the safe working limit of the cable. Thus, a protective mechanism for the cable must allow forces to be transmitted up to the protective limit and then prevent the forces from increasing significantly thereafter while allowing a full range of input motion.

In view of the above, it would be desirable to provide an improved apparatus and method for limiting forces applied to cables that keeps the cable at or below its load limit with the output end held at an end of its range of motion while the input end moves through its full range of motion.

SUMMARY

A overload protection mechanism protects a driven load, such as a driven lever. An overload lever is pivotally coupled to a first part of the driven load. The overload lever has a first end that receives an applied force and an opposing second end. A zero length spring mechanism is coupled to a second part of the driven load spaced apart from the first part and to the second end of the overload lever. The zero length spring mechanism urges the second end of the overload lever toward the second part of the driven load with a force that is substantially proportional to the distance between the second end of the overload lever and the second part of the driven load. A stop mechanism is coupled to the zero length spring mechanism to maintain a minimum distance between the second end of the overload lever and the second part of the driven load.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

DETAILED DESCRIPTION

In the following description, numerous specific details are set forth. However, it is understood that embodiments of the invention may be practiced without these specific details. In other instances, well-known devices, structures and techniques have not been shown in detail in order not to obscure the understanding of this description.

In the following description, numerous specific details are set forth. However, it is understood that embodiments of the invention may be practiced without these specific details. In other instances, well-known circuits, structures and techniques have not been shown in detail in order not to obscure the understanding of this description.

In the following description, reference is made to the accompanying drawings, which illustrate several embodiments of the present invention. It is understood that other embodiments may be utilized, and mechanical compositional, structural, electrical, and operational changes may be made without departing from the spirit and scope of the present disclosure. The following detailed description is not to be taken in a limiting sense, and the scope of the embodiments of the present invention is defined only by the claims of the issued patent.

The terminology used herein is for the purpose of describing particular embodiments only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

Figure 1:
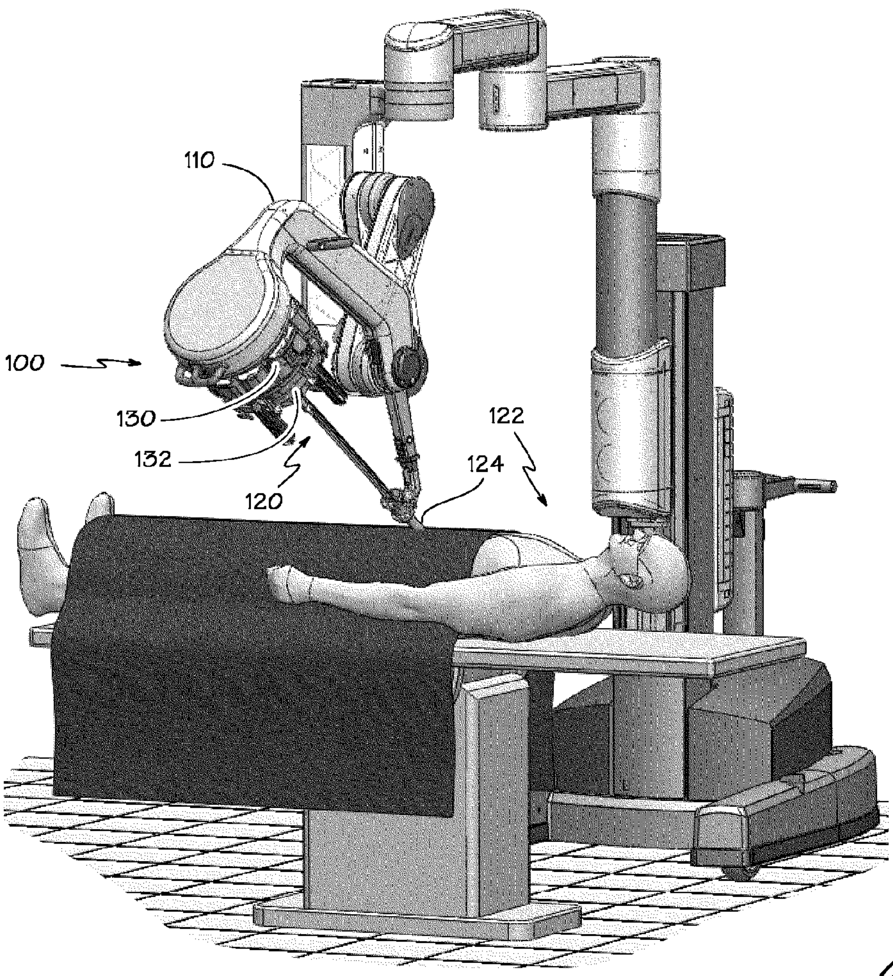
FIG. 1 is a simplified perspective view of a robotic surgical system with a robotically controlled surgical instrument inserted through a port in a patient's abdomen.

FIG. 1 is a simplified perspective view of a robotic surgical system 100, in accordance with embodiments of the present invention. The system 100 includes a support assembly 110 mounted to or near an operating table supporting a patient's body 122. The support assembly 110 supports one or more surgical instruments 120 that operate on a surgical site within the patient's body 122.

The term "instrument" is used herein to describe a device configured to be inserted into a patient's body and used to carry out surgical procedures. The instrument includes a surgical tool, such as a forceps, a needle driver, a shears, a bipolar cauterizer, a tissue stabilizer or retractor, a clip applier, an anastomosis device, an imaging device (e.g., an endoscope or ultrasound probe), and the like. Some instruments used with embodiments of the invention further provide an articulated support for the surgical tool so that the position and orientation of the surgical tool can be manipulated.

The simplified perspective view of the system 100 shows only a single instrument 120 to allow aspects of the invention to be more clearly seen. A functional robotic surgical system would further include a vision system that enables the operator to view the surgical site from outside the patient's body 122. The vision system can include a video monitor for displaying images received by an optical device provided at a distal end of one of the surgical instruments 120. The optical device can include a lens coupled to an optical fiber which carries the detected images to an imaging sensor (e.g., a CCD or CMOS sensor) outside of the patient's body 122. Alternatively, the imaging sensor may be provided at the distal end of the surgical instrument 120, and the signals produced by the sensor are transmitted along a lead or wirelessly for display on the monitor. An illustrative monitor is the stereoscopic display on the surgeon's cart in the da Vinci® Surgical System, marketed by Intuitive Surgical, Inc., of Sunnyvale Calif.

A functional robotic surgical system would further include a control system for controlling the insertion and articulation of the surgical instruments 120. This control may be effectuated in a variety of ways, depending on the degree of control desired, the size of the surgical assembly, and other factors. In some embodiments, the control system includes one or more manually operated input devices, such as a joystick, exoskeletal glove, or the like. These input devices control servo motors which, in turn, control the articulation of the surgical assembly. The forces generated by the servo motors are transferred via drivetrain mechanisms, which transmit the forces from the servo motors generated outside the patient's body 122 through an intermediate portion of the elongate surgical instrument 120 to a portion of the surgical instrument inside the patient's body 122 distal from the servo motor. Persons familiar with telemanipulative, teleoperative, and telepresence surgery will know of systems such as the da Vinci® Surgical System and the Zeus® system originally manufactured by Computer Motion, Inc. and various illustrative components of such systems.

The surgical instrument 120 is shown inserted through an entry guide cannula 124, e.g., a single port in the patient's abdomen. A functional robotic surgical system may provide an entry guide manipulator (not shown; in one illustrative aspect the entry guide manipulator is part of the support system 110) and an instrument manipulator 130. The entry guide 124 is mounted onto the entry guide manipulator 130, which includes a robotic positioning system for positioning the distal end of the entry guide 124 at the desired target surgical site. The robotic positioning system may be provided in a variety of forms, such as a serial link arm having multiple degrees of freedom (e.g., six degrees of freedom) or a jointed arm that provides a remote center of motion (due to either hardware or software constraints) and which is positioned by a setup joint mounted onto a base. Alternatively, the entry guide manipulator may be manually maneuvered so as to position the entry guide 124 in the desired location. In some telesurgical embodiments, the input devices that control the manipulator(s) may be provided at a location remote from the patient (outside the room in which the patient is placed). The input signals from the input devices are then transmitted to the control system, which, in turn, manipulates the manipulators 130 in response to those signals. The instrument manipulator may be coupled to the entry guide manipulator such that the instrument manipulator 130 moves in conjunction with the entry guide 124.

The surgical instrument 120 is detachably connected to the robotic instrument manipulator 130. The robotic manipulator includes a coupler 132 to transfer controller motion from the robotic manipulator to the surgical instrument 120. The instrument manipulator 130 may provide a number of controller motions which the surgical instrument 120 may translate into a variety of movements of the end effector on the surgical instrument such that the input provided by a surgeon through the control system is translated into a corresponding action by the surgical instrument.

Figure 2:
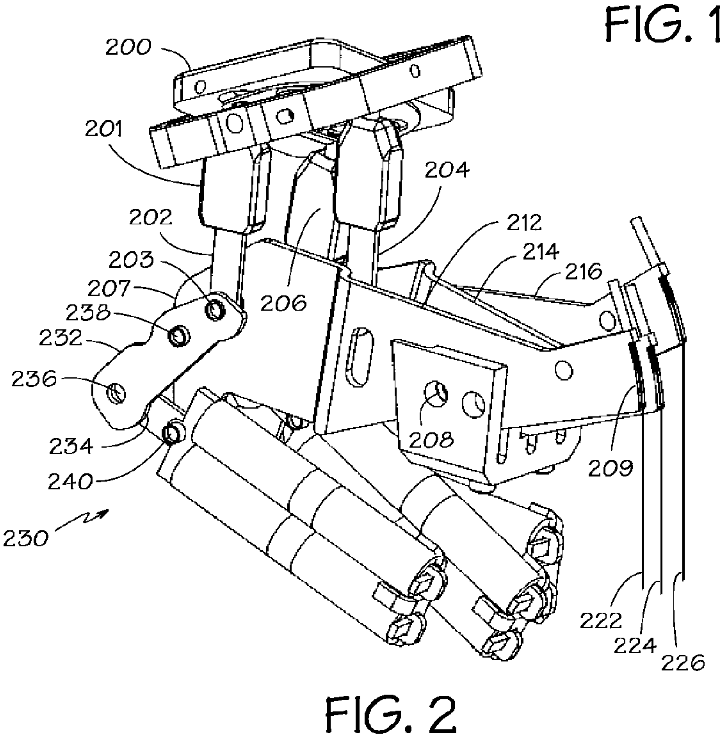
FIG. 2 is a perspective view of an overload protected cable driving mechanism.

FIG. 2 is a perspective view of a cable driving mechanism that is used in the surgical instrument 120. Forces applied on an input gimbal plate 200 drive attached cables 222, 224, 226. The input gimbal plate 200 is coupled to three lever arms 212, 214, 216 by three coupler links 202, 204, 206. Each lever arm 212 is supported by a pivot 208 between a first end 207 and a second end 209 of the lever arm. A first end 203 of each of the coupler links 202 is pivotally coupled to an overload protection mechanism 230 on each of the lever arms 212. A second end 201 of each of the coupler links 202 is pivotally coupled to the input gimbal plate 200, such as by a ball and socket connection. The second ends of the coupler links are not collinear so that any change in the position of the input gimbal plate 200 will move at least one of the coupler links 202, 204, 206. Movement of the coupler links is transmitted by the cables 222, 224, 226 to control, position, and/or orient any of a variety of surgical devices such as forceps, a needle driver, a cautery device, a cutting tool, an imaging device (e.g., an endoscope or ultrasound probe), or a combined device that includes a combination of two or more various tools and imaging devices.

Each coupler link 202 applies a force to the first end 207 of the lever arm 212. The lever arm transfers that force to the cable 222 coupled to the second end 209 of the lever arm with multiplication of the force and displacement according to the well understood principles of levers. The coupler link 202 is coupled to the first end 207 of the lever arm 212 through an overload lever 232. The overload lever is supported by a pivot point 238. A first end 203 of the overload lever 232 is pivotally coupled to the coupler link 202. An opposing second end 236 of the overload lever 232 is coupled to a pivot 240 on the first end 207 of the lever arm 212 by a preloaded spring 230 that urges the second end of the overload lever toward the first end of the lever arm. A stop 234 limits the travel of the second end of the overload lever toward the first end of the lever arm.

If the force applied to the first end 203 of the overload lever 232, with the force multiplication of the overload lever, is less than the force required to overcome the force of the preloaded spring 230 urging the second end 236 of the overload lever toward the first end of the coupler link, then the overload lever provides a solid pivotal connection between the first end 203 of the coupler link 202 and the lever arm 212. When the force applied to the first end 203 of the overload lever 232 reaches the force required to overcome the force of the preloaded spring 230, the overload lever will begin to rotate, in a clockwise direction for the embodiment illustrated, limiting the amount of force the coupler link 202 can apply to the lever arm 212.

Figure 3:
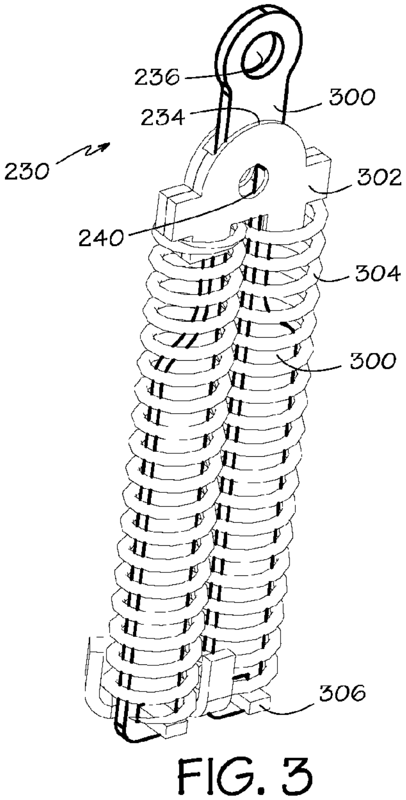
FIG. 3 is a perspective view of an embodiment of a "zero length" spring.

FIG. 3 is a perspective view of an embodiment of a so-called "zero length" spring 230 that couples the second end 236 of the overload lever 232 to the first end 240 of the lever arm 212. The "zero length" spring operates substantially as an ideal tension spring having ends connected to second end 236 of the overload lever and the first end 240 of the lever arm 212. An ideal spring provides a force that is proportional to the distance between its ends 236, 240. Thus, the ideal spring provides a zero force when it has a zero length. It will be appreciated that a real tension spring cannot have a zero length and that it will provide a zero force at some finite length. A so-called "zero length" spring is a spring mechanism that provides a force that is proportional to the distance between its ends, displacement, and which would provide a zero force if it had a zero length. In other words, the slope of a line that plots force against displacement passes through the origin of zero force at zero displacement. A "zero length" spring need not actually be capable of providing a spring having an effective length of zero.

The "zero length" spring shown in FIG. 3 includes a first end cap 302 that is pivotally coupled to the first end 240 of the lever arm 212. A pair of compression springs 304 are supported at a first end by the first end cap 302. A slider 300 passes through the first end cap 302 and the compression springs 304. A second end cap 306 supports a second end of the compression springs 304. The second end cap 306 is coupled to the slider 300. Thus the pair of compression springs 304 are captured on slider and held in compression between the first end cap 302 and the second end cap 306. As the end 236 of the slider 300 is drawn away from the pivotal support 240 of the first end cap 302, the second end cap 306 compresses the pair of compression springs 304. This provides a spring force urging the end 236 of the slider 300 toward the pivotal support 240 of the first end cap 302. The initial compression of the pair of compression springs 304 is chosen so that the assembly operates substantially as a "zero length" spring.

Figure 4:
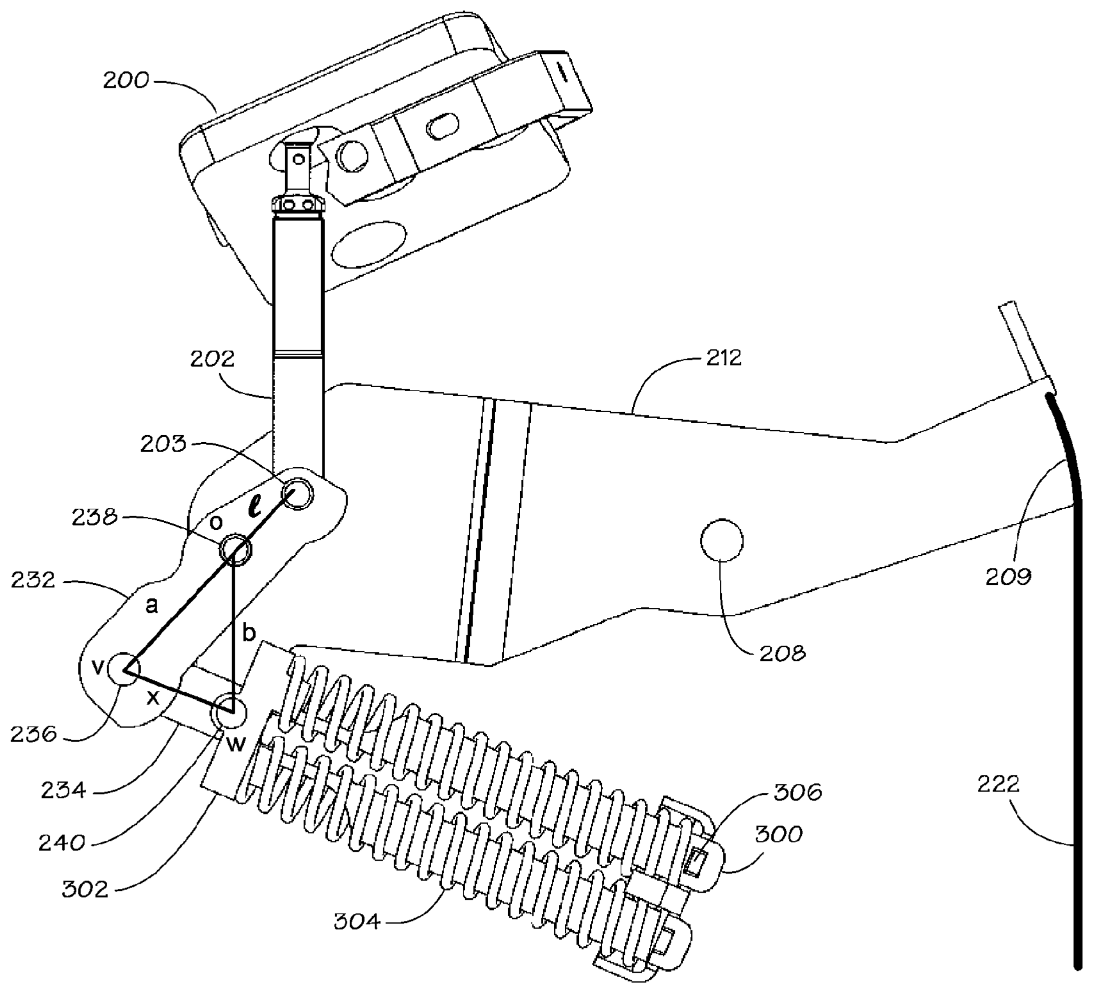
FIG. 4 is a side view of a cable driving lever from the cable driving mechanism shown in FIG. 2 with the cable driving lever in a level position for analyzing forces applied to the driven cable.
Figure 5:
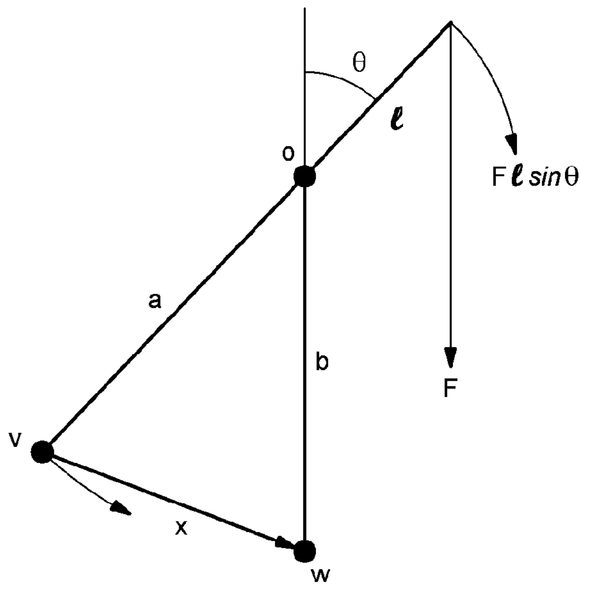
FIG. 5 is a schematic force diagram of the cable driving lever shown in FIG. 4.
Figure 6:
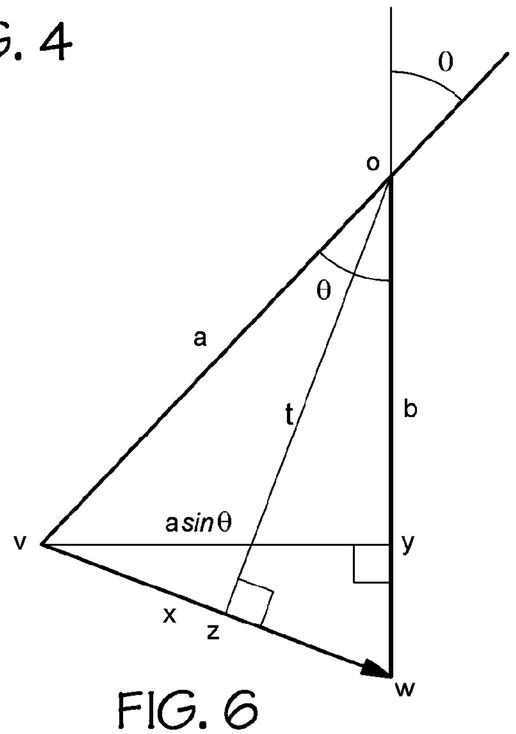
FIG. 6 is a schematic force diagram of the spring overload protection portion of the cable driving lever shown in FIG. 4.

The overload protection mechanism will now be analyzed with reference to FIGS. 4-6. FIG. 4 is a side view of a cable driving lever from the cable driving mechanism shown in FIG. 2 with the cable driving lever arm 212 in a level position for analyzing forces applied to the driven cable 222. The cable driving lever arm 212 and the coupler link 202 are at a first end of their range of travel. The stop portion 234 of the first end cap 302 has been removed to allow the "zero length" spring to be seen more clearly. The forces applied to the driven cable 222 will be proportional to the forces applied to the lever arm 212 as determined by the geometry of the lever arm. Limiting the forces applied to the lever arm 212 is therefore sufficient for limiting the forces applied to the driven cable 222.

The forces applied to the first end 203 of the overload lever 232 by the coupler link 202 are balanced by the forces applied to the second end 236 of the overload lever by the "zero length" spring 230. Once the preload forces of the spring 230 are overcome, the overload lever 232 will begin to rotate and limit the amount of force that is applied to the lever arm 212.

FIG. 5 is a schematic diagram showing the forces generated by the components shown in FIG. 4. The force applied by the coupler link 202 is supported by the overload lever pivot 238 and the force therefore creates a rotational moment that is equal to the vertically applied force F times the distance/from the center of rotation to the point of application for the load times the sine of the angle θ between the load arm and a vertical reference as suggested by the rotational vector (Fl sin θ) at the right of FIG. 5. The rotational moment created by the applied force is counterbalanced by a moment created by the "zero length" spring 230 as suggested by the rotational vector at the left of FIG. 5.

Referring to FIG. 4, the portion of the "zero length" spring 230 that extends between the second end 236 of the overload lever 232 and the pivot 240 on the first end 207 of the lever arm 212 acts as a tension spring with a spring constant K. Therefore we may analyze the forces applied by the "zero length" spring 230 with reference to the triangle formed by the imaginary lines shown as triangle ovw. The center of the overload lever pivot 238 is represented as point o, the center of the connection between the second end 236 of the overload lever 232 and the spring 230 as point v, and the center of the connection between the pivot 240 on the first end 207 of the lever arm 212 and the spring as point w.

For the overload lever 232 to be in equilibrium, the moment $M_o$ about the point o needs to be zero. From FIGS. 5 and 6 we can determine the equation for the moment $M_o$ about the point o as:

$$M_o = Fl \sin\theta - K(x - x_o)t = 0$$

where K is the spring constant of the real springs 304, $x_o$ is the initial length of the effective tension spring formed by the "zero length" spring 230, and x is the length of the effective spring 234. The effective tension spring is the portion 234 of the spring 230 that extends from the second end 236 of the overload lever 232 (point v), and the pivot 240 on the first end 207 of the lever arm 212 (point w) and it is configured as a zero length spring. The spring force of the real springs 304 is configured so that the real springs provide a spring force that is substantially proportional to the distance between the ends of the effective spring 234 along the line x.

The spring force acting through the effective spring 234 creates a moment about the center of the overload lever 232 by acting on an effective moment arm which has the length t of a line from the center of the shaft o normal to the line vw that represents the portion 234 of spring 230 that acts as a zero length tension spring. Hence, $K(x-x_o)t$ is the moment force created by the spring that counterbalances the moment created by the applied force 202. Since this is a zero length spring, $x_o=0$.

Rearranging the terms of the equation we have $$Fl \sin\theta = Kxt$$

With the overload lever 232 at an angle theta (θ) to a vertical reference we can construct a right triangle oyv where the portion of the overload lever 232 between the pivot o 238 and the sprint connection v 236 forms the hypotenuse with a length a. The base of triangle oyv has a length of a sin θ. Using the similarity of triangle wvy to triangle wzo:

$$t/b = a \sin\theta / x$$

Rearranging the equation to solve for t:

$$t = ab \sin\theta / x$$

Substituting for t in the moment balance equation:

$$Fl \sin\theta = Kxab \sin\theta / x$$

$$Fl = Kxab/x$$

$$Fl = Kab$$

Rearranging the terms to solve for the force F needed to rotate the overload lever 232, we have:

$$F = Kab/l$$

Thus, the equation for the force F indicates that the force is constant and independent of the angle theta θ of the link. Therefore, once the force applied to the overload lever 232 reaches $Kx_i$ where $x_i$ is the initial preload length of the effective tension spring because of the stop 234 that prevents the overload lever from rotating to the point where it is completely unloaded, the vertically applied force necessary to rotate the overload lever will remain substantially constant.

Figure 7:
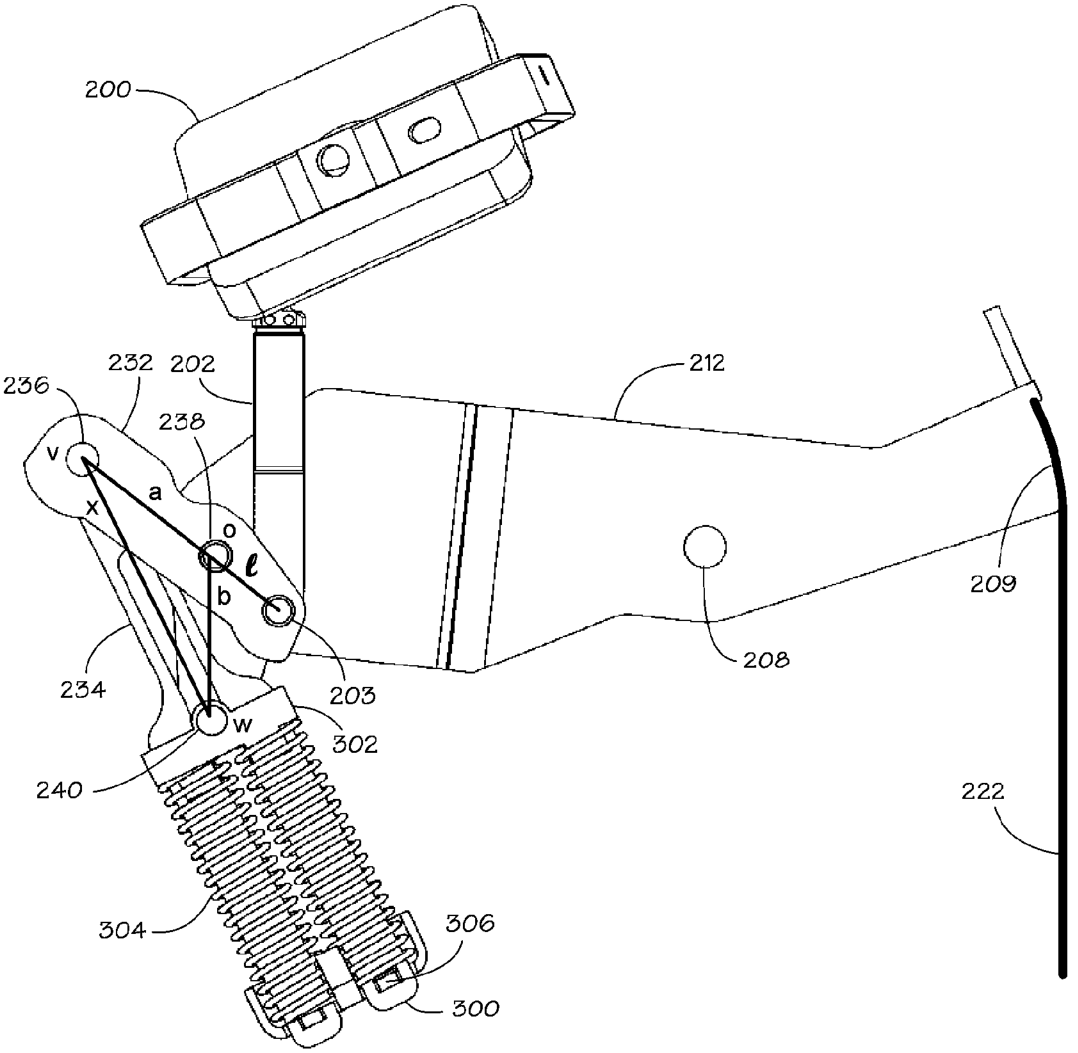
FIG. 7 is a side view of the cable driving lever shown in FIG. 4 with the cable driving lever at the first end of its range of travel while the coupler link has moved through its range of travel to the opposite end of the range.

FIG. 7 is a side view of the cable driving lever shown in FIG. 4 with the cable driving lever arm 212 still at the first end of its range of travel while the coupler link 202 has moved through its range of travel to the opposite end of the range. The rotation of the overload lever 232 limits the forces applied to the lever arm 212 and hence the forces applied to the driven cable 222.

It will be noted that the length of the lever arm between the end 203 of the coupler link 202 that connects to the overload lever and the pivot point 208 of the lever arm 212 changes as the overload lever 232 rotates, which causes some variation in the forces applied to the driven cable 222 over the range of motion of the overload lever.

It will be further noted that the overload lever 232 may be used in configurations where the force applied to the overload lever is not applied in a direction that is parallel to the line that connects the center of the overload lever pivot 238 (point o) and the center of the pivot 240 (point w) that connects the zero length spring to the cable driving lever arm. This will cause variations in the force applied to the driven load as the configuration deviates from the configuration analyzed above. However, the described overload mechanism will still allow the force input to move through its range of motion with the driven output held in a fixed position and limit the force applied to the driven output to a substantially constant value. For example, a typical configuration of the type illustrated can limit the force applied to the driven output to within about ±25% of a nominal value as the direction of the force input varies by about 10 degrees from the ideal direction.

The embodiments described above and the corresponding illustrations show the use first class levers for the driving lever arm and the overload lever. First class levers have a fulcrum point that is between the applied force and the driven load. The invention may also be practiced using second or third class levers for either of the driving lever arm or the overload lever or both. Second class levers have the driven load between the fulcrum and the applied force. Third class levers have the applied force between the fulcrum and the driven load.

Figure 8:
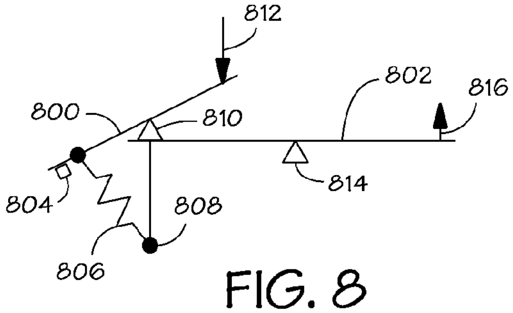
FIG. 8 is a schematic diagram of an embodiment of the invention using first class levers for the driving lever arm and the overload lever.

FIG. 8 is a schematic diagram of an embodiment of the invention using first class levers for the driving lever arm 802 and the overload lever 800. The driving lever arm 802 is supported by a fulcrum 814 that is between the applied force 812 and the driven load 816. The applied force 812 acts on the driving lever arm 802 through the overload lever 800. The overload lever 800 is supported by a fulcrum 810 that is supported by the driving lever arm 802. The overload lever fulcrum is between the applied force 812 and the load of the zero length spring 806. The zero length spring 806 is coupled to a point 808 on the driving lever arm 802. The other end of the zero length spring 806 is coupled to the overload lever 800 to urge rotation of the overload lever in opposition to the applied force 812. The overload lever fulcrum 814 is between the applied force 812 and the load of the zero length spring 806. The stop 804 limits the rotation of the overload lever 800 to provide a preload force that must be overcome before the overload lever rotates in response to the applied force 812 to prevent an overloading force being delivered to the driven load 816. When the applied load is less than the preload force, the overload lever 800 and the driving lever arm 802 move together as a rigid lever. Thus the lever provides a stiff force transmission unless the preload force is exceeded.

Figure 9:
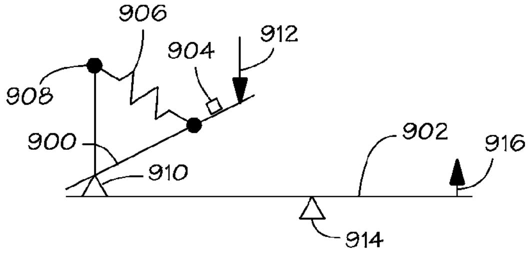
FIG. 9 is a schematic diagram of an embodiment of the invention using a first class lever for the driving lever arm and a second class lever for the overload lever.

FIG. 9 is a schematic diagram of an embodiment of the invention using a first class lever for the driving lever arm 902 and a second class lever for the overload lever 900. The driving lever arm 902 is supported by a fulcrum 914 that is between the applied force 912 and the driven load 916. The applied force 912 acts on the driving lever arm 902 through the overload lever 900. The overload lever 900 is supported by a fulcrum 910 that is supported by the driving lever arm 902. The overload lever fulcrum is between the applied force 912 and the load of the zero length spring 906. The zero length spring 906 is coupled to a point 908 on the driving lever arm 902. The other end of the zero length spring 906 is coupled to the overload lever 900 to urge rotation of the overload lever in opposition to the applied force 912. The overload lever fulcrum 914 is to one side of the applied force 912 and the load of the zero length spring 906. The stop 904 limits the rotation of the overload lever 900 to provide a preload force that must be overcome before the overload lever rotates in response to the applied force 912 to prevent an overloading force being delivered to the driven load 916.

Figure 10:
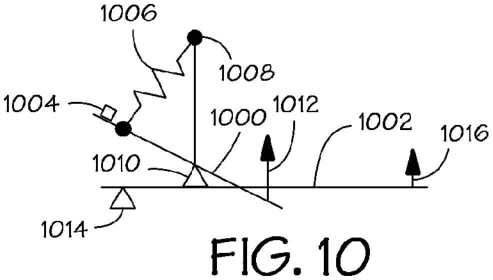
FIG. 10 is a schematic diagram of an embodiment of the invention using a third class lever for the driving lever arm and a first class lever for the overload lever.

FIG. 10 is a schematic diagram of an embodiment of the invention using a third class lever for the driving lever arm 1002 and a first class lever for the overload lever 1000. The driving lever arm 1002 is supported by a fulcrum 1014 that is to one side of the applied force 1012 and the driven load 1016. The applied force 1012 acts on the driving lever arm 1002 through the overload lever 1000. The overload lever 1000 is supported by a fulcrum 1010 that is supported by the driving lever arm 1002. The overload lever fulcrum is between the applied force 1012 and the load of the zero length spring 1006. The zero length spring 1006 is coupled to a point 1008 on the driving lever arm 1002. The other end of the zero length spring 1006 is coupled to the overload lever 1000 to urge rotation of the overload lever in opposition to the applied force 1012. The overload lever fulcrum 1014 is between the applied force 1012 and the load of the zero length spring 1006. The stop 1004 limits the rotation of the overload lever 1000 to provide a preload force that must be overcome before the overload lever rotates in response to the applied force 1012 to prevent an overloading force being delivered to the driven load 1016.

Figure 11:
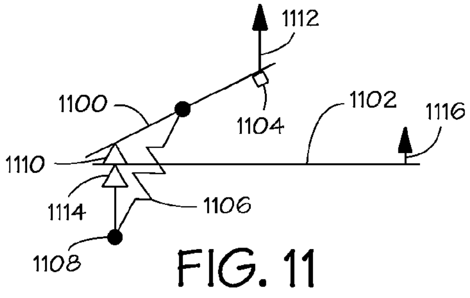
FIG. 11 is a schematic diagram of an embodiment of the invention using a third class lever for the driving lever arm and a second class lever for the overload lever.

FIG. 11 is a schematic diagram of an embodiment of the invention using a third class lever for the driving lever arm 1102 and a second class lever for the overload lever 1100. The driving lever arm 1102 is supported by a fulcrum 1114 that is to one side of the applied force 1112 and the driven load 1116. The applied force 1112 acts on the driving lever arm 1102 through the overload lever 1100. The overload lever 1100 is supported by a fulcrum 1110 that is supported by the driving lever arm 1102. The overload lever fulcrum is between the applied force 1112 and the load of the zero length spring 1106. The zero length spring 1106 is coupled to a point 1108 on the driving lever arm 1102. The other end of the zero length spring 1106 is coupled to the overload lever 1100 to urge rotation of the overload lever in opposition to the applied force 1112. The overload lever fulcrum 1114 is to one side of the applied force 1112 and the load of the zero length spring 1106. The stop 1104 limits the rotation of the overload lever 1100 to provide a preload force that must be overcome before the overload lever rotates in response to the applied force 1112 to prevent an overloading force being delivered to the driven load 1116.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. An overload protection mechanism comprising:

a driven lever having a first end and an opposite second end, the driven lever being supported at a first pivot between the first end and the second end of the driven lever;

an overload lever having a third end and an opposite fourth end, the overload lever being pivotally coupled to the first end of the driven lever at a second pivot between the third end and the fourth end of the overload lever, the overload lever being positioned to receive an applied force at the third end of the overload lever;

a zero length spring mechanism coupled to the fourth end of the overload lever and to a third pivot on the driven lever at a fixed distance apart from the second pivot and the fourth end of the overload lever, the zero length spring mechanism urging the fourth end of the overload lever toward the third pivot on the driven lever with a force that is substantially proportional to a distance between the fourth end of the overload lever and the third pivot on the driven lever; and a stop mechanism coupled to the zero length spring mechanism, the stop mechanism maintaining a minimum distance between the fourth end of the overload lever and the third pivot on the driven lever to provide a preload force that acts against the applied force to prevent rotation of the overload lever when the applied force is less than the preload force.

2. The overload protection mechanism of claim 1 further comprising a coupler link having a fifth end and an opposite sixth end, the fifth end of the coupler link pivotally coupled to the third end of the overload lever, the sixth end of the coupler link receiving the applied force.

3. The overload protection mechanism of claim 1 wherein the driven lever drives a cable coupled to the second end of the driven lever.

4. The overload protection mechanism of claim 3 wherein a first distance between the third end of the overload lever and the first pivot is less than a second distance between the fourth end of the overload lever and the first pivot when the stop mechanism is maintaining the minimum distance between the fourth end of the overload lever and the third pivot on the driven lever.

5. The overload protection mechanism of claim 1 wherein the applied force urges the fourth end of the overload lever away from the third pivot on the driven lever.

6. An overload protected cable driver comprising:

a driven lever having a first end and an opposite second end, the driven lever being supported at a first pivot between the first end and the second end of the driven lever, the driven lever applying a first force to a cable connected to the second end of the driven lever;

an overload lever having a third end and an opposite fourth end, the overload lever being pivotally coupled to the first end of the driven lever at a second pivot between the third end and the fourth end of the overload lever, the overload lever receiving an applied force at the third end of the overload lever;

a zero length spring mechanism coupled to the fourth end of the overload lever and to a third pivot on the driven lever at a fixed distance from the second pivot and the fourth end of the overload lever, the zero length spring mechanism urging the fourth end of the overload lever toward the third pivot on the driven lever with a second force that is substantially proportional to a distance between the fourth end of the overload lever and the third pivot on the driven lever; and a stop mechanism coupled to the zero length spring mechanism, the stop mechanism maintaining a minimum distance between the fourth end of the overload lever and the third pivot on the driven lever such that the second force acts against the applied force to prevent rotation of the overload lever when the applied force is less than the second force at the minimum distance maintained by the stop mechanism.

7. The overload protected cable driver of claim 6 further comprising a coupler link having a fifth end and an opposite sixth end, the fifth end of the coupler link pivotally coupled to the third end of the overload lever, the sixth end of the coupler link receiving the applied force.

8. The overload protected cable driver of claim 7 wherein a first distance between the third end of the overload lever and the first pivot is less than a second distance between the fourth end of the overload lever and the first pivot when the stop mechanism is maintaining the minimum distance between the fourth end of the overload lever and the third pivot on the driven lever.

9. The overload protected cable driver of claim 6 wherein the applied force urges the fourth end of overload lever away from the third pivot on the driven lever.

10. A method of protecting a cable from overload, the method comprising:

applying a first force to a third end of an overload lever being pivotally coupled at a second pivot to a first end of a driven lever, the second pivot being between the third end and an opposite fourth end of the overload lever, the first force causing the driven lever to rotate about a first pivot between the first end and an opposite second end of the driven lever and to apply a second force to the cable connected to the second end of the driven lever;

urging the overload lever to rotate around the second pivot in opposition to the first force with a zero length spring mechanism coupled to the fourth end of the overload lever and to a third pivot on the driven lever at a fixed distance from the second pivot and the fourth end of the overload lever, the zero length spring mechanism providing a force that is substantially proportional to a distance between the fourth end of the overload lever and the third pivot on the driven lever; and limiting rotation of the overload lever with a stop mechanism to provide a preload force that must be overcome before the overload lever rotates in response to the first force to prevent the second force from overloading the cable.

11. The method of claim 10 wherein applying the first force further comprises applying the first force to a sixth end of a coupler link coupled at an opposite fifth end to the third end of the overload lever.

12. The method of claim 11 wherein applying the first force to the third end of an overload lever further urges the fourth end of the overload lever away from the third pivot on the driven lever.

13. An overload protection mechanism comprising:

a driven lever for receiving a first force at a first end and rotating about a first pivot between the first end and an opposite second end of the driven lever to drive a load coupled to the second end of the driven lever;

an overload lever for receiving a second force at a third end, the overload lever being pivotally coupled to the first end of the driven lever at a second pivot between the third end and an opposite fourth end of the overload lever;

a zero length spring mechanism coupled to the fourth end of the overload lever and to a third pivot on the driven lever at a fixed distance from the second pivot and the fourth end of the overload lever, the zero length spring mechanism urging the overload lever to rotate in opposition to the second force with a force that is substantially proportional to an effective length of the zero length spring mechanism; and means for limiting rotation of the overload lever so the zero length spring mechanism provides a preload force that must be overcome before the overload lever rotates in response to the second force to prevent overloading by the first force.

14. The overload protection mechanism of claim 13 wherein the first force is applied to the load by a cable.

15. The overload protection mechanism of claim 13 further comprising means for receiving the second force pivotally coupled to the third end of the overload lever.

16. The overload protection mechanism of claim 14 wherein a first distance between the third end of the overload lever and the first pivot is less than a second distance between the fourth end of the overload lever and the first pivot when the means for limiting rotation of the overload lever is maintaining a minimum distance between the fourth end of the overload lever and the third pivot on the driven lever.

17. The overload protection mechanism of claim 16 wherein the applied force urges the fourth end of the overload lever away from the third pivot on the driven lever.

* * * * *